Figure 1:
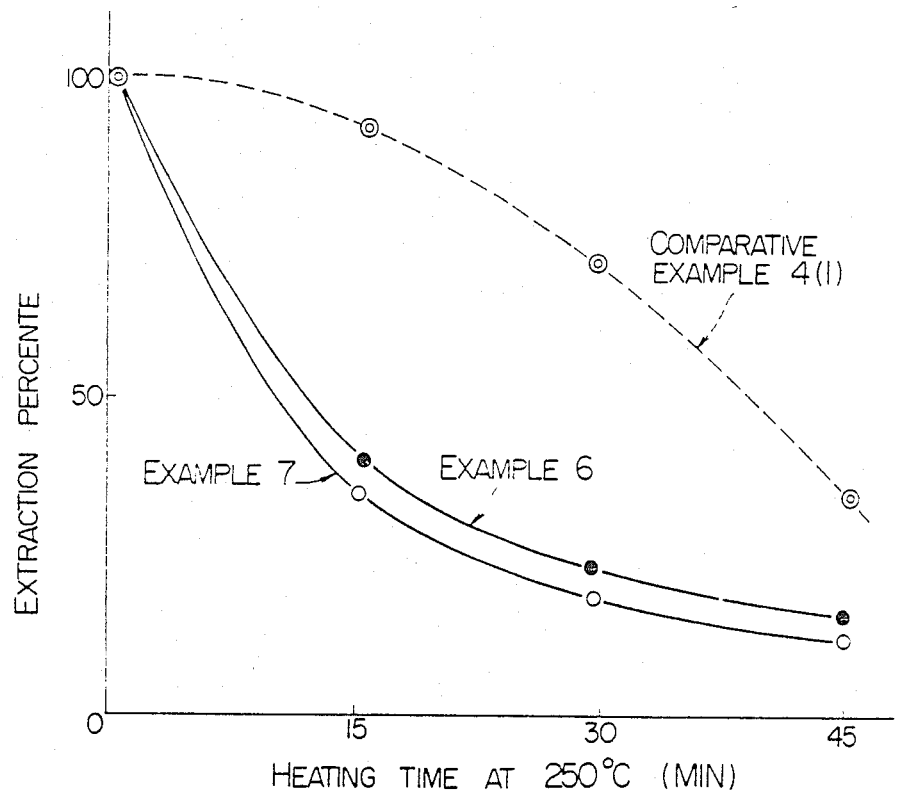

United States Patent [19]

Mukoyama et al.

[11] Patent Number: 4,530,975
[45] Date of Patent: Jul. 23, 1985

[54] POLYAMIDE-IMIDE RESIN COMPOSITION

[75] Inventors: Yoshiyuki Mukoyama, Hitachi; Touichi Sakata, Katsuta; Yuichi Osada, Hitachi, all of Japan

[73] Assignee: Hitachi Chemical Company, Ltd., Tokyo, Japan

[21] Appl. No.: 429,539

[22] Filed: Sep. 30, 1982

Related U.S. Application Data

[62] Division of Ser. No. 186,746, Sep. 12, 1980, abandoned.

[51] Int. Cl.³ .............................................. C08L 79/08
[52] U.S. Cl. .............................. 525/423; 174/110 SR; 524/323; 524/351; 524/352; 524/399; 524/400; 524/589; 525/420; 525/424; 525/425; 525/428; 525/429; 428/378; 428/418; 428/425.8; 428/458
[58] Field of Search ............... 525/420, 423, 424, 425, 525/429, 428; 528/67, 73; 524/323, 351, 352, 399, 400, 589

[56] References Cited

U.S. PATENT DOCUMENTS

| | | | |
|---|---|---|---|
| 3,555,113 | 1/1971 | Sattler | 525/425 |
| 3,852,106 | 12/1974 | Incremona et al. | 525/429 |
| 3,862,261 | 1/1975 | Stoddard | 525/454 |
| 4,088,637 | 5/1978 | Zecher et al. | 528/45 |
| 4,294,952 | 10/1981 | Mukoyama et al. | 528/67 |

FOREIGN PATENT DOCUMENTS

| | | |
|---|---|---|
| 46-29730 | 8/1971 | Japan . |
| 49-30718 | 8/1974 | Japan . |
| 50-20993 | 7/1975 | Japan . |
| 53-47157 | 12/1978 | Japan . |
| 2037788 | 7/1980 | United Kingdom . |

Primary Examiner—Theodore E. Pertilla
Attorney, Agent, or Firm—Antonelli, Terry & Wands

[57] ABSTRACT

A polyamide-imide resin composition comprising (A) a polyamide-imide resin modified with a polyisocyanate containing one or more isocyanurate rings and a lactam and (B) at least one member selected from the group consisting of (i) an alkoxy modified amino resin, (ii) a polyisocyanate containing one or more isocyanurate rings, (iii) a phenol-formaldehyde resin, (iv) an epoxy resin, (v) a polyester resin having one or more hydroxyl groups obtained by using terephthalic acid and/or isophthalic acid as an acid component, and (vi) a metal salt of Sn, Mn, Co or Zn, can give fast curing properties to the resin composition without lowering heat resistance, flexibility, abrasion resistance and also giving good surface appearance to the coating.

11 Claims, 4 Drawing Figures

POLYAMIDE-IMIDE RESIN COMPOSITION

This is a division of application Ser. No. 186,746, filed Sept. 12, 1980, now abandoned.

This invention relates to a polyamide-imide resin composition.

Polyester type varnishes are presently widely used as electrical insulating varnishes, particularly as varnishes for enamelled wires, since they have balanced properties in mechanical properties, electrical properties, heat resistance and the like.

But recent tendency of miniaturization and weight-saving of electrical equipments requires varnishes for enamelled wire to have good heat resistance and excellent abrasion resistance and resistance to Freon. As varnishes for enamelled wires having good heat resistance, abrasion resistance and resistance to Freon, there are known varnishes having high heat resistance such as polyimide varnishes, polyamide-imide varnishes, and the like. But these varnishes have many problems in that they are only soluble in special solvents such as N-methylpyrrolidone (NMP), the resins themselves are expensive, and the like. In order to improve heat resistance of polyester type varnishes for enamelled wires, there have been proposed so-called polyester-imide varnishes containing imide groups in some portions of the resin component. Polyester-imides are improved in heat resistance compared with polyesters but have defects in heat softening properties, resistance to Freon and abrasion resistance. Even in the case of tris(2-hydroxyethyl)isocyanurate modified polyester-imides which are aimed for improving heat softening properties, they are insufficient in abrasion resistance and resistance to Freon and not equal to polyamide-imides.

There have been made various studies on making polyamide-imide varnishes having excellent heat resistance soluble in a general-purpose solvent such as cresol, or the like and also made many proposals for using as a reacting component a lactam, or the like (e.g. Japanese Patent Appln. Kokoku (Post-Exam Publn) Nos. 29730/71, 30718/74, 20993/75, and 47157/78). But the practically obtained lactam co-used polyamide-imide soluble in cresol was remarkably inferior to conventional polyamide-imides in heat resistance, particularly in cut through temperature. In order to improve the heat softening properties, it may be possible to use a polyisocyanate having an isocyanurate ring as a part of an isocyanate compound, but such a composition is improved in the heat softening properties but remarkably lowered in flexibility to fail to give a practically valuable resin. For example, when a baking time becomes long, flexibility is lowered although heat softening properties are good, while when a baking time is short, the resin cannot sufficiently be polymerized to give a high molecular weight and thus is lowered in heat softening properties and flexiblity.

The present inventors have developed previously a polyamide-imide obtained from a polyisocyanate containing isocyanurate rings, an aromatic diisocyanate, a lactam and an acid anhydride, and being good in heat resistance and flexibility and soluble in cresol, but such a resin had a problem in workability, since when it was subjected to high-speed baking work, it was not able to be polymerized sufficiently to give a high molecular weight and cut through temperature and flexibility were lowered. The present inventors considered that a cause of the problem in high-speed workability might be dependent on a curing rate of the resin, and after extensive studies found that a major reason was in slowness of the curing rate and accomplished this invention.

On the other hand, it is known to use a phenolic resin, an epoxy resin, a melamine resin, or the like as a curing agent for linear polyamide-imides. Among them, the use of a melamine resin is disclosed in Japanese Patent Appln Kokai (Laid-Open) No. 102278/73. But even if a melamine resin is added to a fundamentally linear polyamide-imide containing no polyisocyanate having isocyanurate rings as a component, no improvement in flexibility and cut through temperature can be obtained as to enamelled wires practically and rather there is a tendency to lower these properties, so that the melamine resin is not used practically.

The present inventors noticed that a polyamide-imide resin having remarkably higher heat resistance than the linear polyamide-imide can be obtained by including polyisocyanate units containing isocyanurate rings in the skeleton of the resin and studied curing agents (crosslinking agents) for the polyisocyanate containing isocyanurate rings.

As a result, it was found that when special components used in this invention were added to polyamide-imide resins modified with polyisocyanate containing isocyanurate rings and lactam, remarkable effects were obtained in preventing lowering in flexibility and in cut through temperature at the time of high-speed work without lowering flexibility and cut through temperature of enamelled wires and accomplished this invention.

Further, polyamide-imide resins are widely used as heat resistant coatings for coating heat resistant cooking devices, bearing of inner portion of electronic ranges, magnetic wires, and the like. But since general-purpose polyamide-imide resins such as HI-404, HI-600 (trade names, manufactured by Hitachi Chemical Co., Ltd.) are only soluble in N-methylpyrrolidone (NMP) and the like special solvent, there is a great problem from the viewpoint of a cost because of the use of expensive solvent. The present inventors have previously developed a polyamide-imide having good heat resistance and impact strength and being soluble in cresol. Such a polyamide-imide was able to provide good heat resistance and impact strength as well as good appearance without blister when baking conditions were properly selected, but was inferior to the general-purpose HI-404, HI-600 and the like in surface appearance of coated film because of fine surface roughening and wrinkles on the surface.

This seemed to be a fundamental problem of the polyamide-imide modified with polyisocyanate containing isocyanurate rings and lactam and being soluble in cresol caused by slowness of curing rate of it. After studying extensively, the present inventors have found that the fine surface roughening and wrinkles on the surface was able to be improved by adding a metal salt of Sn, Mn, Co and/or Zn to the resin and accomplished this invention.

This invention provides a polyamide-imide resin composition comprising (A) a polyamide-imide resin produced by reacting in a cresol type solvent a polyisocyanate containing one or more isocyanurate rings, an aromatic diisocyanate, a lactam and a polycarboxylic acid containing at least one acid anhydride group, and (B) at least one member selected from the group consisting of (i) an alkoxy modified amino resin,
(ii) a polyisocyanate containing one or more isocyanurate rings,
(iii) a phenol-formaldehyde resin,
(iv) an epoxy resin,
(v) a polyester resin having one or more hydroxyl groups obtained by using terephthalic acid and/or isophthalic acid as an acid component, and
(vi) at least one metal salt of Sn, Mn, Co and/or Zn.

Figure 2:
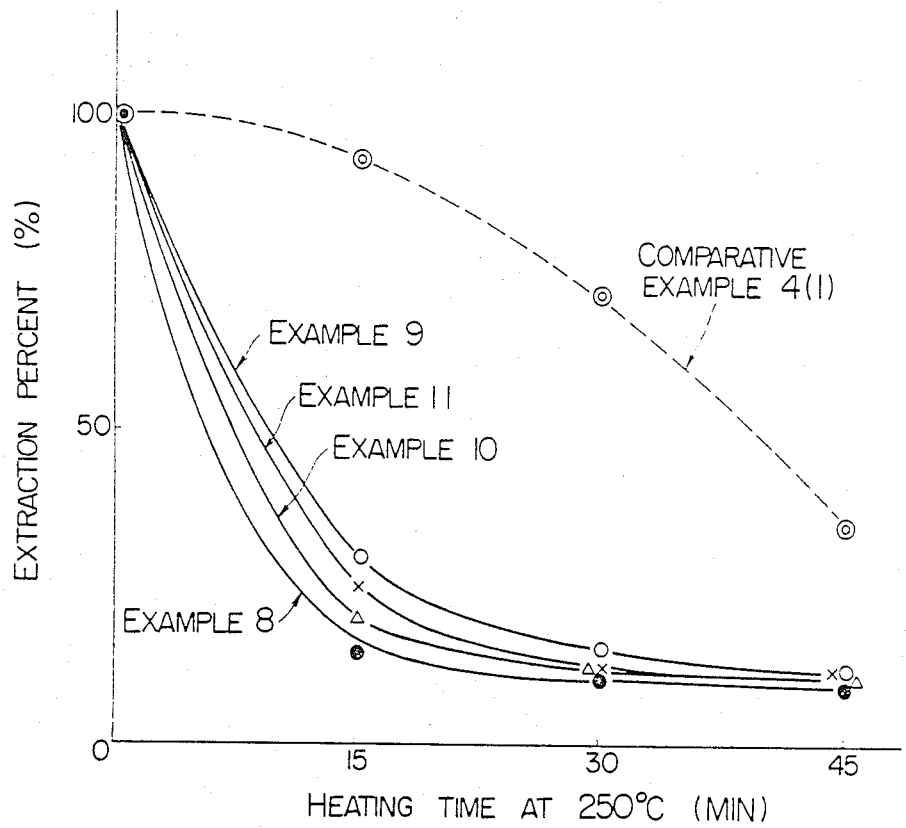
Figure 3:
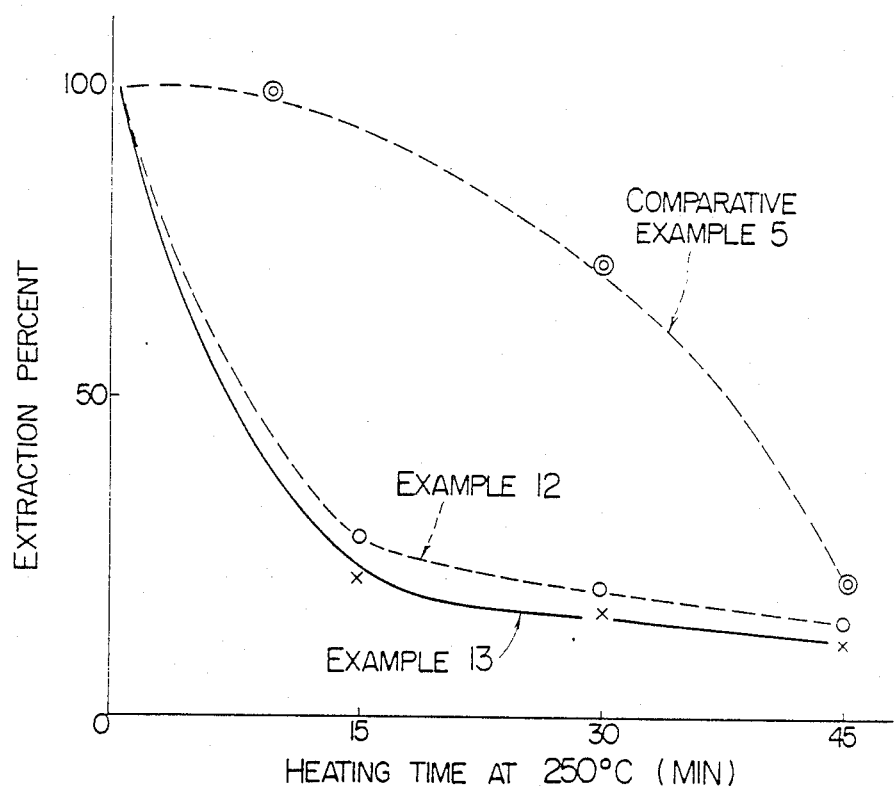
Figure 4:
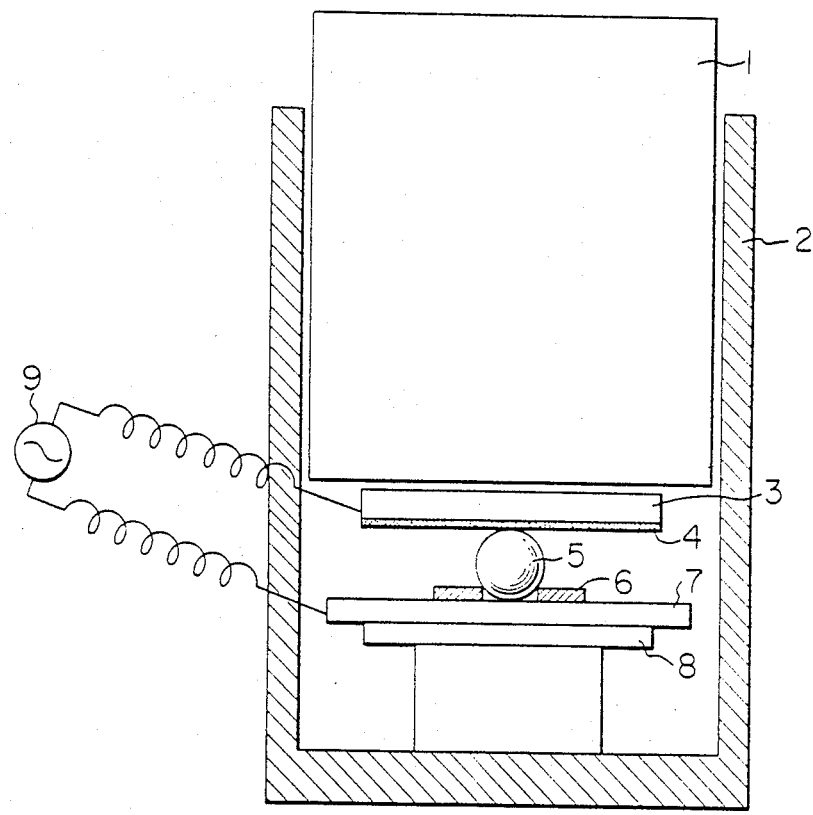

In the attached drawings,

FIGS. 1 to 3 are graphs showing a relationship between extraction percent and heating time at 250° C., and FIG. 4 is a schematic drawing of an apparatus for measuring a cut through temperature.

The polyisocyanate containing one or more isocyanurate rings can be obtained, for example, by trimerization of a polyisocyanate compound. This reaction can be carried out in a solvent which does not react with the isocyanate group. In order to conduct the reaction effectively, it is desirable to use a catalyst for trimerization of polyisocyanate compounds. The product is a polyisocyanate containing one or more isocyanurate rings, said polyisocyanate being a nonmasked material. As the solvent, any ones which can dissolve the polyisocyanate compounds can be used. Examples of the solvents are aliphatic and aromatic hydrocarbons, halogenated aromatic hydrocarbons, esters, ketones, ethers, ethylene glycol monoalkyl monoacetates, dimethylsulfoxide, and the like.

Examples of the catalysts for trimerization of polyisocyanate compounds are alkali metal acetates, metal salts of iron, magnesium, nickel, zinc, tin, lead, vanadium, titanium, etc., organometallic compounds such as titanium tetrabutoxide, N-methyl morpholine, 1,8-diazabicyclo(5,4,0)undecene-7, Mannich bases of phenol such as 2-(dimethylaminomethyl)-4,6-dimethylphenol, etc., tertiary amines such as N,N-bis-(dimethylaminoethyl)-N-methylamine, 2-dimethylaminoethanol, etc., and organic carboxylates of tertiary amines.

The trimerization of the polyisocyanate compound can be carried out, for example, at a temperature of 0° to 160° C.

Practical trimerization of polyisocyanate compound is very complicated and an isocyanate adduct containing only one isocyanurate ring in a molecule is not always obtained selectively. In addition, there is also obtained a mixture containing unreacted polyisocyanate and isocyanate adducts containing two or more isocyanurate rings in a molecule. In this invention, such a mixture can also be used. The amount of the catalyst and the reaction temperature can be determined depending on the number of isocyanurate rings contained in the isocyanate adducts. For example, in the case of conducting the reaction so that the proportion of remaining isocyanate groups becomes about 50%, 0.01 to 2% by weight of a tertiary amine based on the weight of the starting polyisocyanate and a reaction temperature of 30° to 150° C. are preferably employed.

As the starting polyisocyanate for producing the polyisocyanate containing one or more isocyanurate rings, any diisocyanate compounds which can form isocyanurate rings can be used either aliphatic, alicyclic or aromatic. Taking heat resistance, solubility and production cost into consideration, preferable examples are aromatic diisocyanates, particularly 4,4'-diphenylmethane diisocyanate, tolylene diisocyanate, xylylene diisocyanate, 4,4'-diphenylether diisocyanate, and the like. These compounds may be used alone or as a mixture of two or more of them.

The polyisocyanates containing one or more isocyanurate rings can be used alone or as a mixture of two or more of them. It is also possible to use one or more polyisocyanates previously synthesized or one or more polyisocyanates containing one or more isocyanurate rings stabilized by blocking agents such as phenol, cresol, etc., after the synthesis in order to prevent changes with the lapse of time. The number of isocyanurate rings in the polyisocyanate containing one or more isocyanurate rings may be changed depending on the uses, but the content of remaining isocyanate group is preferably in the range of 10 to 70% (taking the content of isocyanate group in the starting diisocyanate 100%). If the content is too much, heat resistance is lowered, while too little, flexibility is lowered.

The amount of the polyisocyanate containing one or more isocyanurate rings to be used is very important in this invention as well as that of the lactam mentioned below. It is preferable to use the polyisocyanate containing one or more isocyanurate rings in an amount of 1 to 30 equivalent % based on the total isocyanate equivalent. If the amount is outside the above-mentioned range, properties balanced in heat resistance and flexibility cannot be obtained. Further, if the amount is too much, gelation may take place during the synthesis due to enhanced degree of branching.

As the lactams which are important starting materials for solubilizing the final product in a cresol type solvent as well as the polyisocyanate containing one or more isocyanurate rings, any ones which can react with isocyanate groups and/or acid anhydride groups in a cresol type solvent and are soluble in the solvent may be used. Examples of the lactams are ε-caprolactam, dodecyl lactam, etc. These lactams can be used alone or as a mixture thereof. Among them, ε-caprolactam is preferable taking solubility, reactivity and production cost into consideration.

It is not necessary to use the lactam in equivalent amount to the isocyanate group (taking ε-caprolactam as bifunctional, i.e. 1 mole is equal to 2 equivalents). There is no guarantee that use of a large amount of lactam makes the lactam effectively taken into the skeleton of the produced resin. The lactam is used in an amount of 20 to 90 equivalent % based on the total isocyanate equivalent taking heat resistance, flexibility, and solubility into consideration totally and making the lactam substantially taken into the resin. If the amount is outside the above-mentioned range, there is obtained no polyamide-imide resin having properties balanced in heat resistance and flexibility and excellent in resistance to Freon, abrasion resistance, etc.

As the aromatic diisocyanates, there can preferably be used 4,4'-diphenylmethane diisocyanate, 4,4'-diphenylether diisocyanate, tolylene diisocyanate, xylylene diisocyanate, etc. These diisocyanates can be used alone or as a mixture of two or more of them.

As the polycarboxylic acids containing at least one acid anhydride group, there can be used any carboxylic acids containing an acid anhydride group which reacts with isocyanate groups and their derivatives such as represented by the following formulae:

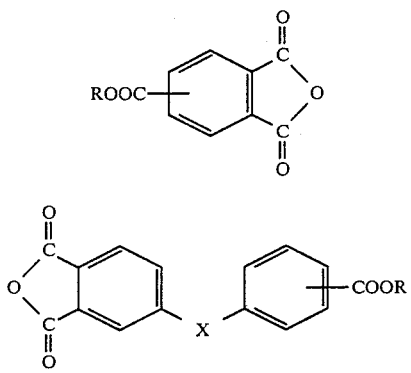

wherein R is hydrogen, alkyl having preferably 1 to 8 carbon atoms, or phenyl; and X is —CH$_2$—, —CO—, —SO$_2$—, or —O—, for example, trimellitic anhydride, etc. These polycarboxylic acids can be used alone or as a mixture thereof. If necessary, a portion of the polycarboxylic acid containing at least one acid anhydride group may be replaced by at least one carboxylic acid dianhydride such as pyromellitic dianhydride, benzophenonetetracarboxylic dianhydride, butanetetracarboxylic dianhydride, bicyclo[2,2,2]-oct-(7)-ene-2:3, 5:6-tetracarboxylic dianhydride and their derivatives and/or at least one aliphatic or aromatic dibasic acid such as adipic acid, sebacic acid, etc. Among them, trimellitic anhydride, is preferable taking heat resistance and production cost into consideration.

The amounts of the isocyanate component and the acid component to be used are preferably in the range of 1.5 to 0.7/1 in terms of a ratio of the carboxyl group and the acid anhydride group to the isocyanate group. Particularly, in order to obtain a resin having high molecular weight, the ratio of about 1/1 is most preferable.

The reaction for producing the desired polyamide-imide resin can be carried out by charging all the starting materials at the same time and conducting the reaction at a temperature of about 160° to 230° C. A preferable process for preventing clouding is to charge all the isocyanate components, the lactam, and the cresol type solvent into a reactor, to react at a temperature of 160° to 190° C. for 1 to 3 hours, to add the polycarboxylic acid containing at least one acid anhydride group to the reactor, and to continue the reaction at a temperature of 200° to 230° C. for 3 to 20 hours. The progress of the reaction can be controlled by measuring bubbles of carbon dioxide gas generated during the reaction and a viscosity of the reaction solution. In order to prevent changes with the lapse of time and to conduct the reaction uniformly, it is effective to dissolve the isocyanate component in the cresol type solvent previously. In order to assist the progress of the reaction, there can be use as a catalyst organometallic salts such as tin octoate, zinc octoate, cobalt octoate, etc. and tertiary amines conventionally used in the art.

As the cresol type solvent, there can be used cresol, phenol, xylenol, etc. These solvent may be used alone or a mixture thereof. As a portion of a mixture of solvents, there can be used high-boiling point aromatic organic solvents such as xylene, NISSEKI HISOL-100 and 150 (trade names of aromatic hydrocarbons manufactured by Nippon Petrochemicals Co., Ltd.), Cellosolve Acetate, and the like.

The thus produced polyamide-imide resin soluble in a cresol type solvent is excellent in heat resistance, resistance to Freon, and abrasion resistance and properly good in flexibility, when the resin alone is used. But since the curing rate is relatively slow as mentioned above, there is a defect in that it takes a longer time for baking compared with conventional varnishes (i.e. poor in high-speed workability). Therefore, it is necessary to shorten the baking time, that is, to make curing faster. On the other hand, in the case of increasing a baking speed, there usually take place worsening in appearance and lowering in flexibility as well.

In order to avoid such undesirable phenomena, the special component (B) is used as a curing agent in this invention. The component (B) is used in an amount of preferably 1 to 300 parts by weight per 100 parts by weight of the component (A).

As the alkoxy modified amino resins (i), there can be used any ones which are prepared by reacting an amino compound such as melamine, benzoguanamine, urea or the like with formaldehyde or paraformaldehyde by addition condensation reaction, and alkoxylating the resulting methylol group or groups with an alcohol such as methanol, ethanol, propanol, butanol, or the like, or co-condensation polymers or a mixture thereof. Although reasons are not clear, alkoxy modified benzoguanamine-formaldehyde type resins such as butylated benzoguanamine-formaldehyde resin are effective.

The effect of addition of the alkoxy modified amino resin is remarkable in the case of the polyamide-imide resin soluble in cresol used in this invention, but such an effect cannot be shown in the case of conventional polyamide-imide resins soluble in NMP type solvents. The mixing amount of the alkoxy modified amino resin (i) in the polyamide-imide resin (A) varies depending on the composition of the alkoxy modified amino resin to be mixed, the molecular weight and functional groups of the resin, and in general it is decided within the range not bringing about phase separation and depending on the utility. In the case of an enamel for wires, it is more preferable to add the alkoxy modified amino resin in an amount of about 1 to 20% by weight in terms of the resin weight based on the weight (solid content) of the polyamide-imide resin. As the mixing method, there can be used any methods, for example, an alkoxy modified amino resin solution is previously dissolved in cresol and the resulting mixture is added to the polyamide-imide resin, or to a directly warmed polyamide-imide resin solution, an alkoxy modified amino resin solution is added dropwise. The temperature at the time of mixing is in the range of from room temperature to 200° C. wherein no phase separation takes place and uniform mixing is possible.

As the polyisocyanate containing one or more isocyanurate rings (ii), there can be used any ones which are produced by trimerization of a polyisocyanate compound. For example, a trimer obtained by reacting an aromatic diisocyanate, particularly tolylene diisocyanate in the presence of a tertiary amine or a mixture of the trimer and polyisocyanates containing one or more isocyanurate rings are preferable.

The amount of the polyisocyanate containing one or more isocyanurate rings (ii) as a curing agent to be added varies depending on polyfunctoinality of the polyisocyanate to be added, but in the case of an enamel for wires, it is more preferable to use about 1 to 20% by weight in terms of the solid content based on the weight (solid content) of the polyamide-imide resin. It can also be used those previously masked with phenol, cresol, ε-caprolactam, or the like. As an adding method, the polyisocyanate (ii) can be added to the polyamide-imide resin at normal temperatures, or it can be added to a directly warmed polyamide-imide resin solution. It is also effective to mix it with other resin for enamelled wires such as a polyester resin, polyester-imide resin, depending on the utility.

As the phenol-formaldehyde resin (iii), there can be used a phenol-formaldehyde resin, an alkylphenol-formaldehyde resin, a modified phenol-formaldehyde resin derived therefrom, and the like and there is no limit to the kinds thereof. As the modified phenol-formaldehyde resins, there can be used, for example, amino compound modified phenol-formaldehyde resins such as melamine modified phenol-formaldehyde resin, benzoguanamine modified phenol-formaldehyde resin, urea modified phenol-formaldehyde resin, and the like, and the amino compound can be the above-mentioned alkoxy modified amino resin.

The mixing amount of the phenol-formaldehyde resin varies depending on the molecular weight and the kind of functional groups contained, and usually is within the range not to bring about phase separation depending on the utility. In the case of an enamel for wires, it is more preferable to use in an amount of about 1 to 30% by weight in terms of the resin weight based on the weight (solid content) of the polyamide-imide resin. As a mixing method, the phenol-formaldehyde resin to be added is previously dissolved in cresol and the resulting mixture is added to the polyamide-imide resin, or the phenol-formaldehyde resin can be added dropwise to a directly warmed polyamide-imide resin solution.

As the epoxy resin (iv), there can be used bisphenol type epoxy resins such as Epikote 828, 1001, 1004, 1007, etc. (manufactured by Shell Chemical Corp.), novolac type epoxy resins such as DEN 438 (manufactured by Dow Chemical Co.), heterocyclic-ring-containing epoxy resins such as TEPIC (manufactured by Shikoku Kasei K.K., Japan) containing tris(glycidyl) isocyanurate, alicyclic type epoxy resins such as CH 221 (manufactured by UCC, Ltd.) etc., and there is no particular limitation to the epoxy resins to be used.

The mixing amount of the epoxy resin varies depending on the kind of it and usually is within the range not to bring about phase separation depending on the utility. For example, in the case of an enamel for wires, it is more preferable to use in an amount of about 1 to 30% by weight in terms of the resin weight based on the weight of the polyamide-imide resin. As a mixing method, the epoxy resin to be added is previously dissolved in cresol and the resulting mixture is added to the polyamide-imide resin, or the epoxy resin can be added dropwise to a directly warmed polyamide-imide resin solution. In order to avoid an increase of the viscosity with the lapse of time after the addition of the epoxy resin, it is preferable to add the epoxy resin to the polyamide-imide resin immediately before the use, if possible.

It is also effective to use as a curing catalyst the polyester resin having one or more hydroxyl groups or hydroxyl residues obtained by using terephthalic acid and/or isophthalic acid as an acid component (v). In the production of such a polyester (v), terephthalic acid and/or isophthalic acid are used as an acid component. In such a case, there can be used in place of terephthalic acid and isophthalic acid, for example, one or more lower alkyl esters of terephthalic and isophthalic acids such as dimethyl terephthalate, monomethyl terephthalate, diethyl terephthalate, dimethyl isophthalate, diethyl isophthalate, and the like, or one or more condensates of terephthalic acid and/or isophthalic acid with a glycol such as polyethyleneterephthalate, polyethyleneisophthalate, etc.

As the acid component, there can be co-used acids which are generally used in electrical insulating varnishes such as adipic acid, succinic acid, phthalic acid, trimellitic anhydride, an imidodicarboxylic acid of the formula:

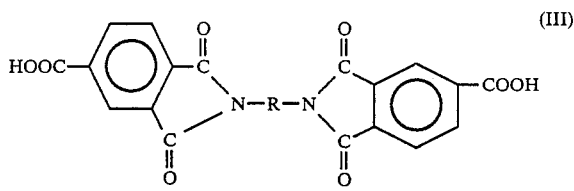

wherein R is a bivalent organic radical. The imidodicarboxylic acid of the formula (III) can be produced by reacting 1 mole of an diamine with about 2 moles of trimellitic anhydride as disclosed in, for example, Japanese Patent Appln Kokoku (Post-Exam Publn) No. 40113/76. As the diamine, there can be used 4,4'-diaminodiphenylmethane, m-phenylenediamine, p-phenylenediamine, 1,4-diaminonaphthalene, 4,4'-diaminodiphenyl ether, 4,4'-dimethylheptamethylenediamine, hexamethylenediamine, 4,4'-dicyclohexylmethanediamine, diaminodiphenyl sulfone, etc. Needless to say, there can also be used an imidodicarboxylic acid obtained by using a diisocyanate in place of a diamine.

As the alcohol component used for the production of the polyester having one or more hydroxyl groups (v) mentioned above, there can be used one or more polyhydric alochols. There can be used as dihydric alcohols ethylene glycol, diethylene glycol, neopentyl glycol, 1,4-butanediol, 1,6-hexanediol, 1,4-cyclohexanedimethanol, etc., as tri- or higher hydric alcohols, glycerin, trimethylolpropane, tris(2-hydroxyethyl)isocyanurate, pentaerythritol, etc. The use of tris(2-hydroxyethyl)idocyanurate is preferable from the viewpoint of heat resistance.

The synthesis of the polyester having one or more hydroxyl groups (v) can be carried out in excess hydroxyl groups until a OH value of preferably 60 to 200 is reached. As catlyst for the synthesis, there can be used those conventionally used such as lead oxide, lead acetate, tetrabutyl titanate, etc. and there is no particular limitation thereto. The temperature for the synthesis is usually 150° to 300° C.

When the polyester having one or more hydroxyl groups (v) is mixed with the polyamide-imide resin, it is diluted with a solvent which is usually used in varnishes for enamelled wires, e.g. cresol, phenol, xylenol, N-methylpyrrolidone, xylene, etc. so that the nonvolatile content becomes 10 to 90% by weight. The polyester having one or more hydroxyl groups (v) may contain a curing agent usually used in varnishes for enamelled wires, e.g. tetrabutyl titanate, tetraisopropyl titanate, zinc naphthenate, cobalt octoate, block isocyanate (Desmodule-CT stable, manufactured by Japan Polyurethane Industries, Co.), or the like before the mixing with the polyamide-imide resin.

The temperature for mixing the polyester (v) with the polyamide-imide resin is usually from room temperature to about 200° C. and not particularly limited so long as a uniform mixing is possible.

The amount of the polyester (v) to be mixed is not particularly limited but usually from 1 to 300% by weight, more preferably 3 to 30% by weight based on the weight (solid content) of the polyamide-imide resin.

In order to improve fine surface roughening or wrinkles, at least one metal salt of Sn, Mn, Co and Zn (vi) is added to the polyamide-imide resin. Examples of such metal salts are dibutyl tin laurate, dibutyl tin acetate, manganese naphthenate, manganese octoate, cobalt naphthenate, cobalt octoate, zinc naphthenate, zinc octoate, and the like, these being usually used as dryer. These metal salts can be used alone or a mixture thereof.

The metal salt (vi) is preferably used in an amount of 0.01 to 10 parts by weight, more preferably 0.1 to 5 parts by weight per 100 parts by weight in terms of the solid content of the polyamide-imide resin. The mixing of the metal salt (vi) with the polyamide-imide resin can be carried out at from room temperature to about 200° C. and there is no particular limitation thereto.

In addition to the above-mentioned component (B), i.e. the alkoxy modified amino resin (i), the polyisocyanate containing one or more isocyanurate rings (ii), the phenol-formaldehyde resin (iii), the epoxy resin (iv), the polyester resin having one or more hydroxyl groups obtained by using terephthalic acid and/or isophthalic acid as an acid component (v), and the metal salt of Sn, Mn, Co and Zn, there can be used one or more other additives such as polyester resins other than that mentioned above, melamine resins other than that mentioned above, polyethers, polyamides e.g., nylon-6, nylon-6,6, nylon-12, polyamide-imide, polyimide, polyhydantoin, guanidine carbonate, benzotriazole, furan resin, phenoxy resin, rubbers e.g., telechelic rubber having an average molecular weight of several thousand, natural rubber, acrylic rubber, acrylonitrile-butadiene rubber, hydrin rubber, urethane rubbers, thioether rubber, butadiene rubber, in order to improve properties. These additives can be used in an amount of 0.1 to 30% by weight based on the resin solid content.

Further, as curing catalyst, there can be used for improving properties tertiary amines such as triethylamine, triethylenediamine, N-methylmorpholine, N,N-diethylethanolamine, dimethylaniline, etc., organic titanium compounds such as tetrabutyl titanate, tetrapropyl titanate, etc.

The thus obtained polyamide-imide resin composition can be used, for example, as a varnish by diluting it with a polar solvent, e.g. a cresol type solvent mentioned above, NMP, dimethylformamide, dimethylacetamide, or the like to a resin content of 20 to 40% by weight. In such a case, considering the resin concentration and viscosity, there may be used as auxiliary solvent xylene, NISSEKI HISOL-100 (trade name of aromatic hydrocarbon mixture, manufactured by Nippon Petrochemicals Co., Ltd.), Cellosolve Acetate (trademark, ethylene glycol monoethyl monoacetate, manufactured by Dow Chemical Co.), and the like.

The coating film obtained by using such a varnish is good in heat resistance, resistance to Freon (resistance to refrigeration medium), flexibility and abrasion resistance and improved in fast curing properties and appearance, so that it can sufficiently be put to practical use. Further, the polyamide-imide resin composition containing the metal salt (vi) can give a coating film having good heat resistance, impact strength, and improved in preventing fine surface roughening and wrinkles.

The polyamide-imide resin composition of this invention having fast curing properties and being soluble in a cresol type solvent can be used as a varnish for enamelled wires mainly, but it can also be used as an impregnating varnish for electrical insulation, a casting varnish, a heat resistant overcoating agent, a heat resistant paint or varnish, heat resistant film, a heat resistant adhesive, a heat resistant laminating material, heat resistant complex materials together with glass fibers or carbon fibers, and the like.

This invention is illustrated by way of the following Examples, in which all parts and percents are by weight unless otherwise specified.

COMPARATIVE EXAMPLE 1

(1) Synthesis of trimer of aromatic diisocyanate

| Ingredients | Grams |
| --- | --- |
| Tolylene diisocyanate | 600 |
| Xylene | 600 |
| 2-Dimethylaminoethanol (catalyst) | 1.8 |

The above-mentioned ingredients were placed in a four-necked flask equipped with a thermometer and a stirrer and heated to 140° C. under nitrogen stream. The reaction was conducted at that temperature until the isocyanate group content became 25% (the initial concentration 48%). The resulting product showed the absorption of isocyanurate ring at 1710 cm$^{-1}$ and 1410 cm$^{-1}$ and the absorption of isocyanate group at 2260 cm$^{-1}$ in the infrared spectra.

(2) Synthesis of polyamide-imide resin soluble in cresol

| Ingredients | Grams | Equivalent ratio |
| --- | --- | --- |
| Diisocyanate trimer synthesized in above (1) (a 50% solution) | 37.0 | 0.11 |
| 4,4'-Diphenylmethane diisocyanate | 113.3 | 0.91 |
| Trimellitic anhydride | 96.0 | 1.00 |
| ε-Caprolactam | 36.6 | 0.65 |
| Cresol | 300 | |

The above-mentioned ingredients except for trimellitic anhydride were placed in a four-necked flask equipped with a thermometer, a stirrer and a fractional distillation tube and heated to 180° C. under nitrogen stream to conduct the reaction at that temperature for 90 minutes. Subsequently, trimellitic anhydride was added to the flask and the temperature was raised to 210° C. The reaction was conducted at 210° C. for 15 hours. The resin concentration was adjusted to 30% with cresol to give a varnish. The varnish had a viscosity of 250 poises. Infrared spectra of the resin showed the absorption of imide group at 1780 cm$^{-1}$ and the absorption of amide group at 1650 cm$^{-1}$.

COMPARATIVE EXAMPLE 2

(1) Synthesis of butylated benzoguanamine-formaldehyde resin

| Ingredients | Grams | Mole |
| --- | --- | --- |
| Benzoguanamine | 37.4 | 0.2 |
| Paraformaldehyde (purity 80%) | 30 | 0.8 |
| Isobutyl alcohol | 118.4 | 1.6 |

The above-mentioned ingredients were placed in a 300-ml three-necked flask equipped with a thermometer, a condenser having a receiver for determining water quanitatively, and a stirrer. The temperature was raised to 100° C. at a rate of 5° C. per minute with stirring and the reaction was conducted at that temperature for 1 hour. Subsequently, 50 mg of phthalic anhydride was added to the flask and the temperature was raised to 110° C. While maintaining the temperature at 110° C., dehydration with reflux was conducted. At a time of completion of the dehydration reaction, the butanol was taken out of the system until the temperature in the reaction system was raised to 130° C. When the temperature was raised to 130° C., removal of the butanol was stopped and the flask was cooled. When the temperature was lowered to 50° C., the reaction mixture was diluted with a mixed solvent of butanol/xylol (1/1 by weight) to give a resin solution having a solid content of 55%.

(2) Preparation of polyamide-imide resin composition containing butylated benzoguanamine-formaldehyde resin To previously heated (100° C.) HI-404 (trade name, NMP solvent series polyamide-imide resin composition manufactured by Hitachi Chemical Co., Ltd.), the butylated benzoguanamine-formaldehyde resin solution synthesized in above (1) was added with stirring in an amount of 5 parts in terms of the solid content per 100 parts of HI-404 in terms of the solid content to give a uniform resin solution.

EXAMPLE 1

The polyamide-imide resin synthesized in Comparative Example 1 (2) was warmed to about 80° C. and to this the butylated benzoguanamine-formaldehyde resin solution synthesized in Comparative Example 2 (1) was added in an amount of 3 parts in terms of the solid content per 100 parts of the polyamide-imide resin in terms of the solid content to give a uniform polyamide-imide resin composition.

EXAMPLE 2

The polyamide-imide resin synthesized in Comparative Example 1 (2) was warmed to about 150° C. and to this the butylated benzoguanamine-formaldehyde resin solution synthesized in Comparative Example 2 (1) was added in an amount of 5 parts in terms of the solid content per 100 parts of the polyamide-imide resin in terms of the solid content to give a uniform polyamide-imide resin composition.

EXAMPLE 3

(1) Synthesis of butylated benzoguanamine-formaldehyde resin

| Ingredients | Grams | Mole |
| --- | --- | --- |
| Benzoguanamine | 22.4 | 0.12 |
| Melamine | 10.1 | 0.08 |
| Paraformaldehyde (purity 80%) | 36.0 | 0.96 |
| Isobutyl alcohol | 118.4 | 1.6 |

The above-mentioned ingredients were reacted in the same manner as described in Comparative Example 2 (1). The resulting resin was diluted with a mixed solvent of butanol/xylene (1/1 by weight) to give a resin solution having a solid content of 55%.

(2) Preparation of polyamide-imide resin composition containing butylated benzoguanamine-formaldehyde resin A polyamide-imide resin composition was obtained in the same manner as described in Example 2 except for using the butylated benzoguanamine-formaldehyde resin synthesized in above (1) in an amount of 8 parts in terms of the solid content.

The thus obtained resin compositions (varnishes) were coated on wires to give enamelled (or insulated) wires and properties thereof were tested and listed in Table 1.

The enamelled wires were produced under the following conditions throughout the Examples:
  Furnace: a vertical type furnace having a height of 4.5 m
  Furnace temperature: entrance/middle/exit = 300° C./350° C./400° C. (in Comparative Examples 2 and 3, 280° C./300° C./320° C.)
  Diameter of wire: 1 mm, finished with one kind
  Drawing speed: as listed in Tables 1, 2 and 3
  Properties were tested according to JIS C 3003. But in the case of cut through temperature, 2 kg of load was used.

TABLE 1

| Sample (Example No.) | Comparative Example 1 | | HI-404 | | Comparative Example 2 | | Example 1 | | Example 2 | | Example 3 | |
| --- | --- | --- | --- | --- | --- | --- | --- | --- | --- | --- | --- | --- |
| Drawing speed (m/min) | 7.5 | 9 | 10 | 12 | 10 | 12 | 7.5 | 9 | 7.5 | 9 | 7.5 | 9 |
| Properties | | | | | | | | | | | | |
| Cut through temp. (°C.) (load 2 kg) | 370 | 310 | 391 | 390 | 368 | 371 | 370 | 365 | 372 | 368 | 360 | 362 |
| Flexibility (winding around its diameter) | Good | Many cracks | Good | Good | Cracks | Cracks | Good | Good | Good | Good | Good | Good |
| Abrasion resistance (times) (load 600 g) | 102 | 50 | 202 | 181 | 45 | 52 | 101 | 88 | 92 | 88 | 90 | 94 |

TABLE 1-continued

| Sample (Example No.) | Comparative Example 1 | | HI-404 | | Comparative Example 2 | | Example 1 | | Example 2 | | Example 3 | |
|---|---|---|---|---|---|---|---|---|---|---|---|---|
| Surface state | Good | Blister | Good | Blister | Good | Blister | Good | Good | Good | Good | Good | Good |

As shown in HI-404 and Comparative Example 2, when an alkoxy modified amino resin is added to a fundametnally linear polyamide-imide resin conventionally used, cut through temperature, flexibility and abrasion resistance are remarkably lowered when the wires are drawn at a standard drawing speed of 10 m/min and the surface state of the wires is not improved when drawn at a drawing speed of 12 m/min.

On the contrary, as shown in Comparative Example 1 and Examples 1 to 3, when an alkoxy modified amino resin is added to a polyamide-imide resin modified with a polyisocyanate containing one or more isocyanurate rings and a lactam, no lowering in cut through temperature, flexibility and abrasion resistance is observed in the wires drawn at a standard speed of 7.5 m/min and further almost no lowering in cut through temperature, flexibility and abrasion resistance is observed and the surface state is remarkably improved in the wires drawn at a high drawing speed of 9 m/min (high-speed working).

As is clear from the above-mentioned results, when an alkoxy modified amino resin is added to the polyamide-imide resin modified with a polyisocyanate containing one or more isocyanurate rings and a lactam, there takes place no lowering in cut through temperature, flexibility, abrasion resistance, and the like and high speed workability can be improved remarkably.

Such a prominent effect cannot be thought of from the combination of a conventional polyamide-imide resin and an alkoxy modified amino resin. Thus the polyamide-imide resin composition of this invention has a very important meaning industrially.

COMPARATIVE EXAMPLE 3

Synthesis of polyamide-imide resin soluble in cresol

| Ingredients | Grams | Equivalent ratio |
|---|---|---|
| Diisocyanate trimer synthesized in Comparative Example 1 (1) (a 50% solution) | 33.3 | 0.10 |
| 4,4'-Diphenylmethane diisocyanate | 113.3 | 0.91 |
| Trimellitic anhydride | 96.0 | 1.00 |
| ε-Caprolactam | 36.6 | 0.65 |
| Cresol | 300 | |

The above-mentioned ingredients except for trimellitic anhydride were placed in a four-necked flask equipped with a thermometer, a stirrer and a fractional distillation tube and heated to 180° C. under nitrogen stream to conduct the reaction at that temperature for 90 minutes. Subsequently, trimellitic anhydride was added to the flask and the temperature was raised to 210° C. The reaction was conducted at 210° C. for 15 hours. The resin concentration was adjusted to 30% with cresol to give a varnish. The varnish had a viscosity of 250 poises. Infrared spectra of the resin showed the absorption of imide group at 1780 cm$^{-1}$ and the absorption of amide group at 1650$^{-1}$. When the varnish was used for baking enamelled wires, it was adjusted with cresol so that the solid content became 30%.

EXAMPLE 4

The polyamide-imide resin synthesized in Comparative Example 3 was warmed to about 100° C. and to this the polyisocyanate containing isocyanurate rings (diisocyanate trimer) synthesized in Comparative Example 1 (1) was added in an amount of 3 parts in terms of the solid content per 100 parts of the polyamide-imide resin in terms of the solid content with stirring to give a uniform polyamide-imide resin composition having a 30% of solid content.

EXAMPLE 5

The polyisocyanate containing one or more isocyanurate rings synthesized in Comparative Example 1 (1) was dissolved and reacted in cresol heated at 120° C. previously and the resulting solution was added to the polyamide-imide resin synthesized in Comparative Example 3 in an amount of 8 parts in terms of the solid content per 100 parts of the polyamide-imide resin in terms of the solid content to give a uniform polyamide-imide resin composition having a solid content of 30%.

The thus obtained resin compositions (varnishes) were coated on wires and properties thereof were tested and listed in Table 2.

TABLE 2

| Sample (Example No.) | Comparative Example 3 | | Example 4 | | Example 5 | |
|---|---|---|---|---|---|---|
| Drawing speed (m/min) | 7.5 | 9 | 7.5 | 9 | 7.5 | 9 |
| Properties | | | | | | |
| Cut through temp. (°C.) (load 2 kg) | 370 | 310 | 370 | 372 | 370 | 367 |
| Flexibility (winding around its diameter) | Good | Many cracks | Good | Good | Good | Good |
| Abrasion resistance (times) (load 600 g) | 102 | 50 | 110 | 95 | 104 | 100 |
| Surface state | Good | Blister | Good | Good | Good | Good |

As shown in Comparative Example 3 and Examples 4 and 5, when a polyisocyanate containing one or more isocyanurate rings is added to a polyamide-imide resin modified with a polyisocyanate containing one or more isocyanurate rings and a lactam, no lowering in cut through temperature, flexibility and abrasion resistance is observed in the wires when drawn at a standard drawing speed of 7.5 m/min and further almost no lowering in cut through temperature, flexibility and abrasion resistance is observed and the surface state is remarkably improved in the wires drawn at a high drawing speed of 9 m/min (high-speed working).

As is clear from the above-mentioned results, when an polyisocyanate containing one or more isocyanurate rings is added to the polyamide-imide resin modified with a polyisocyanate containing one or more isocyanurate rings and a lactam, there takes place no lowering in cut through temperature, flexibility, abrasion resistance and the like, and high speed workability can be improved remarkably. Thus, the polyamide-amide resin composition soluble in a cresol type solvent of this invention has a very important meaning industrially.

COMPARATIVE EXAMPLE 4

Synthesis of polyamide-imide resin soluble in cresol

| Ingredients | Grams | Equivalent ratio |
|---|---|---|
| Diisocyanate trimer synthesized in Comparative Example 1 (1) (a 50% solution) | 33.3 | 0.10 |
| 4,4'-Diphenylmethane diisocyanate | 113.3 | 0.91 |
| Trimellitic anhydride | 96.0 | 1.00 |
| ε-Caprolactam | 36.6 | 0.65 |
| Cresol | 340 | |

The above-mentioned ingredients except for trimellitic anhydride were placed in a four-necked flask equipped with a thermometer, a stirrer, and a fractional distillation tube and heated to 180° C. under nitrogen stream to conduct the reaction at that temperature for 90 minutes. Subsequently, trimellitic anhydride was added to the falsk and the temperature was raised to 210° C. The reaction was conducted at 210° C. for 15 hours. The resin concentration was adjusted to 30% with cresol to give a varnish. The varnish had a viscosity of 250 poises. Infrared spectra of the resin showed the absorption of imide group at 1780 cm$^{-1}$ and the absorption of amide group at 1650 cm$^{-1}$.

(2) Synthesis of phenol-formaldehyde resin

| Ingredients | Grams | Equivalent ratio |
|---|---|---|
| Cresylic acid | 425 | 1.17 |
| Formaldehyde (a 37% aqueous solution) | 303 | 1.00 |
| Triethanolamine | 5 | |

The above-mentioned ingredients were placed in a four-necked flask equipped with a thermometer, a stirrer, and a reflux condenser, and refluxed at 98° C. with stirring for 90 minutes. Subsequently, the reflux condenser was removed and the reaction was continued at a reduced pressure of 30 to 50 mm Hg at 50° C. for 5 hours. Then, the resulting resin was diluted with 450 g of cresylic acid to give a phenol-formaldehyde resin solution.

EXAMPLE 6

The polyamide-imide resin synthesized in Comparative Example 4 (1) was warmed to about 100° C. and to this the phenol-formaldehyde resin synthesized in Comparative Example 4 (2) was added in an amount of 3 parts in terms of the solid content with stirring per 100 parts of the polyamide-imide resin in terms of the solid content to give a uniform polyamide-imide resin composition.

EXAMPLE 7

The polyamide-imide resin synthesized in Comparative Example 4 (1) was warmed to 80° C. and to this the phenol-formaldehyde resin synthesized in Comparative Example 4 (2) was added in an amount of 8 parts in terms of the solid content per 100 parts of the polyamide-imide resin in terms of the solid content with stirring to give a uniform polyamide-imide resin composition.

Film Forming Method and Extraction Method

The polyamide-imide resin compositions (varnishes) of Comparative Example 4 (1), Examples 6 and 7 were adjusted to contain nonvolatile content of 30% and coated on steel plates bonderized (0.8 mm thick) and polished with sand paper (400 CW) previously in a thickness of 0.30 mm. Each coated plate was placed in a hot air blowing type oven at 250° C. and dried and baked for 15 minutes, 30 minutes or 45 minutes, respectively to give film coated plates. From each film coated plate, about 1 g of the coated film was peeled off, placed in a flask equipped with a condenser and immersed in 50 g of cresol followed by heat treatment at 100° C. for 5 hours. After the treatment, the solution was filtered with a glass filter (3G - 2) and washed with methanol. Residue of filtration (undissolved material) was dried at 100° C. in a reduced pressure drier for 8 hours and weighed to provide extraction percents. The results are as shown in FIG. 1.

As is clear from FIG. 1, extraction percents of Examples 6 and 7 are reduced in a short time compared with Comparative Example 4 (1). This means that the addition of phenol-formaldehyde resin to the polyamide-imide resin provides fast curing properties to the polyamide-imide resin composition. Thus, the polyamide-imide resin composition of this invention has a great industrial value in the field wherein high-speed workability is required.

EXAMPLE 8

The polyamide-imide resin synthesized in Comparative Example 4 (1) was warmed to about 80° C. and to this an epoxy resin (Epikote 828 manufactured by Shell Chemical Corp.) was added in an amount of 5 parts in terms of the solid content per 100 parts of the polyamide-imide resin in terms of the solid content with stirring to give a uniform polyamide-imide resin composition.

EXAMPLE 9

The polyamide-imide resin synthesized in Comparative Example 4 (1) was warmed to 100° C. and to this an epoxy resin (Epikote 1007 manufactured by Shell Chemical Corp.) was added in an amount of 15 parts in terms of the solid content per 100 parts of the polyamide-imide resin in terms of the solid content with stirring to give a uniform polyamide-imide resin composition.

EXAMPLE 10

The polyamide-imide resin synthesized in Comparative Example 4 (1) was warmed to 100° C. and to this a novolac type epoxy resin (DEN 438 manufactured by Dow Chemical Co.) was added in an amount of 10 parts in terms of the solid content per 100 parts of the polyamide-imide resin in terms of the solid content with stirring to give a uniform polyamide-imide resin composition.

EXAMPLE 11

The polyamide-imide resin synthesized in Comparative Example 4 (1) was warmed to 80° C. and to this an alicyclic type epoxy resin (CH 221 manufactured by UCC, Ltd.) was added in an amount of 5 parts in terms of the solid content per 100 parts of the polyamide-imide resin in terms of the solid content with stirring to give a uniform polyamide-imide resin composition.

Film Forming Method and Extraction Method

The polyamide-imide resin compositions (varnishes) of Comparative Example 4 (1), and Examples 8 to 11 were adjusted to contain nonvolatile content of 30% and coated on steel plates bonderized (0.8 mm thick) and polished with sand paper (400 CW) previously in a thickness of 0.30 mm. Each coated plate was placed in a hot air blowing type oven at 250° C. and dried and baked for 15 minutes, 30 minutes, or 45 minutes, respectively, to give film coated plates. From each film coated plate, about 1 g of the coated film was peeled off, placed in a flask equipped with a condenser and immersed in 50 g of cresol followed by heat treatment at 100° C. for 5 hours. After the treatment, the solution was filtered with a glass filter (3G - 2) and washed with methanol. Residue of filtration (undissolved material) was dried at 100° C. in a reduced pressure drier for 8 hours and weighed to provide extraction percents. The results are as shown in FIG. 2.

As is clear from FIG. 2, extraction percents of Examples 8 to 11 are reduced in a short time compared with Comparative Example 4 (1). This means that the addition of epoxy resin to the polyamide-imide resin provides fast curing properties to the polyamide-imide resin composition. Thus the polyamide-imide resin composition of this invention has a great industrial value in the field wherein high-speed workability is required.

COMPARATIVE EXAMPLE 5

Synthesis of polyamide-imide resin soluble in cresol

| Ingredients | Grams | Equivalent ratio |
| --- | --- | --- |
| Diisocyanate trimer synthesized in Comparative Example 1 (1) (a 50% solution) | 30.0 | 0.09 |
| 4,4'-Diphenylmethane diisocyanate | 113.3 | 0.91 |
| Trimellitic anhydride | 96.0 | 1.00 |
| ε-Caprolactam | 36.6 | 0.65 |
| Cresol | 300 | |

The above-mentioned ingredients except for trimellitic anhydride were placed in a four-necked flask equipped with a thermometer, a stirrer and a fractional distillation tube and heated to 180° C. under nitrogen stream to conduct the reaction at that temperature for 90 minutes. Subsequently, trimellitic anhydride was added to the flask and the temperature was raised to 210° C. The reaction was conducted at 210° C. for 15 hours. The resin concenrration was adjusted to 30% with cresol to give a varnish. The varnish had a viscosity of 250 poises. Infrared spectra of the resin showed the absorption of imide group at 1780 cm$^{-1}$ and the absorption of amide group at 1650 cm$^{-1}$. When the varnish was used for baking enamelled wires, it was adjusted with cresol so that the solid content became 30%.

COMPARATIVE EXAMPLE 6

Synthesis of polyester

| Ingredients | Grams | Gram equivalent |
| --- | --- | --- |
| Dimethyl terephthalate | 517.9 | 5.34 |
| Tris(2-hydroxyethyl)-isocyanurate | 381.6 | 4.38 |
| Ethylene glycol | 100.5 | 3.24 |
| Tetrabutyl titanate (catalyst) | 1.0 | |
| Cresol | 176.5 | |

The above-mentioned ingredients were placed in a four-necked flask equipped with a thermometer, a stirrer, a fractional distillation tube, and reacted at 180°-220° C. under nitrogen stream to give a resin having a OH value of 175.

Cresol was added to the produced resin to give a varnish having a resin content of 30%.

COMPARATIVE EXAMPLE 7

A polyester varnish (WH-407 manufactured by Hitachi Chemical Co., Ltd.) produced from terephthalic acid, glycerin and ethylene glycol was used.

COMPARATIVE EXAMPLE 8

A polyester varnish (Isomid manufactured by Nisshoku Schenectady Co., Ltd.) produced from terephthalic acid, imidodicarboxylic acid, tris(2-hydroxyethyl)isocyanurate and ethlene glycol was used.

EXAMPLE 12

The polyamide-imide resin synthesized in Comparative Example 5 was warmed to about 150° C. and to this the polyester resin synthesized in Comparative Example 6 was added in an amount of 10 parts in terms of the solid content per 100 parts of the polyamide-imide resin in terms of the solid content with stirring to give a uniform polyamide-imide resin composition.

EXAMPLE 13

To the polyamide-imide resin synthesized in Comparative Example 5 in an amount of 100 parts in terms of the solid content, WH-407 of Comparative Example 7 was added in an amount of 10 parts in terms of the solid content to give a uniform polyamide-imide resin composition.

EXAMPLE 14

To the polyamide-imide resin synthesized in Comparative Example 5 in an amount of 100 parts in terms of the solid content, Isomid of Comparative Example 8 was added in an amount of 5 parts in terms of the solid content to give a uniform polyamide-imide resin composition.

In order to show improvement in fast curing properties by the addition of a polyester resin to the polyamide-imide resin, films were formed from the varnishes of Comparative Example 5, Examples 12 and 13, and enamelled wires were formed from the varnishes of Comparative Example 5, Examples 12 and 14, by varying baking times.

As to the films, extraction percents by cresol were measured and as to the enamelled wires, practical properties were measured.

(1) Film Forming and Extraction Methods

The polyamide-imide resin compositions (varnishes) of Comparative Example 5 and Examples 12 and 13 were adjusted to contain nonvolatile content of 30% and coated on steel plates bonderized (0.8 mm thick) and polished with sand paper (400 CW) previously in a thickness of 0.30 mm. Each coated plate was placed in a hot air blowing type oven at 250° C. and dried and baked for 15 minutes, 30 minutes, or 45 minutes, respectively, to give film coated plates. From each film coated plate, about 1 g of the coated film was peeled off, placed in a flask equipped with a condenser and immersed in 50 g of cresol followed by heat treatment at 100° C. for 5 hours.

After the treatment, the solution was filtered with a glass filter (3G - 2) and washed with methanol. Residue of filtration (undissolved material) was dried at 100° C. in a reduced pressure drier for 8 hours and weighed to provide extraction percents. The results are as shown in FIG. 3.

(2) Properties of Enamelled Wires

Properties of enamelled wires obtained from Comparative Example 5, and Examples 12 and 14 were measured and listed in Table 3.

TABLE 3

| Sample (Example No.) | Comparative Example 5 | | Example 12 | | Example 14 | |
| --- | --- | --- | --- | --- | --- | --- |
| Drawing speed (m/min) | 7.5 | 9 | 7.5 | 9 | 7.5 | 9 |
| Properties | | | | | | |
| Cut through temp. (°C.) (load 2 kg) | 370 | 310 | 370 | 360 | 372 | 370 |
| Flexibility (winding around its diameter) | Good | Many cracks | Good | Good | Good | Good |
| Abrasion resistance (times) (load 600 g) | 98 | 42 | 92 | 89 | 90 | 85 |

As is clear from FIG. 3, in the case of the polyamide-imide resin modified by a polyisocyanate containing one or more isocyanurate rings and a lactam, cresol extraction percents of 30% or less can only be obtained by heating at 250° C. for 45 minutes or more. In contrast, in the case of Examples 12 and 13 wherein polyester resins having one or more hydroxyl groups obtained by using terephthalic acid and/or isophthalic acid as an acid component are added to the polyamide-imide resin, cresol extraction percents of 30% or less can easily be obtained by heating at 250° C. for only 15 minutes. This clearly shows that the addition of the polyester resin having one or more hydroxyl groups obtained by using terephthalic acid and/or isophthalic acid as an acid component is effective to improve fast curing properties of the polyamide-imide resin.

Further as shown in Table 3, cut through temperature, flexibility and abrasion resistance are remarkably lowered in Comparative Example 5 when the wire is drawn at a drawing speed of 9 m/min with a relatively short baking time, whereas almost no lowering was observed in cut through temperature, flexibility and abrasion resistance in the case of Examples 12 and 14. This also shows that the addition of polyester resin having one or more hydroxyl groups obtained by using terephthalic acid and/or isophthalic acid as an acid component is effective to improve fast curing properties of the polyamide-imide resin.

Thus, this invention is very effective in the improvement of workability of polyamide-imide resins and has a very important meaning industrially.

COMPARATIVE EXAMPLE 9

Synthesis of polyamide-imide resin soluble in cresol

| Ingredients | Grams | Equivalent ratio |
| --- | --- | --- |
| Diisocyanate trimer synthesized in Comparative Example 1 (1) (a 50% solution) | 407 | 0.10 |
| 4,4'-Diphenylmethane diisocyanate | 1120 | 0.90 |
| Trimellitic anhydride | 960 | 1.00 |
| ε-Caprolactam | 366 | 0.65 |
| Cresol | 3100 | |

The above-mentioned ingredients except for trimellitic anhydride were placed in a four-necked flask equipped with a thermometer, a stirrer, and a fractional distillation tube and heated to 180° C. under nitrogen stream to conduct the reaction at that temperature for 90 minutes. Subsequently, trimellitic anhydride was added to the flask and the temperature was raised to 210° C. The reaction was conducted at 210° C. for 15 hours. The resin content was adjusted to 30% with cresol to give a varnish. The varnish had a viscosity of 250 poises. Infrared spectra of the resin showed the absorption of imide group at 1780 cm$^{-1}$ and the absorption of amide group at 1650 cm$^{-1}$.

EXAMPLES 15 to 18

To 100 parts in terms of the solid content of the polyamide-imide resin synthesized in Comparative Example 9, each metal salt as listed in Table 4 was added to give a varnish.

TABLE 4

| Example No. | Metal salt | Amount (parts) |
| --- | --- | --- |
| 15 | Zinc naphthenate | 2.0 |
| 16 | Cobalt octoate | 0.5 |
| 17 | Dibutyl tin laurate | 0.5 |
| 18 | Manganese naphthenate | 1.0 |

After defoaming the varnishes of Comparative Example 9 and Examples 15 to 18, these varnishes were coated in 0.325 mm thick on a surface of bonderized steel plates (0.775 mm thick) and polished with sand paper (400 CW). Each coated plate was dried and baked at 250° C. for 30 minutes to give film coated plates.

Using these film coated plates, cut through temperature (as an index of heat resistance), Erichsen test (as an index of flexibility), and impact resistance (impact test according to the du Pont method) were measured and surface appearance was judged by the naked eye.

The results are as shown in Table 5.

TABLE 5

| Example No. | Comparative Example 9 | Example 15 | Example 16 | Example 17 | Example 18 |
| --- | --- | --- | --- | --- | --- |
| Cut through temp.*[1] (°C.) | 370 | 368 | 371 | 370 | 370 |
| Erichsen test*[2] (mm) | 70 | 72 | 70 | 68 | 72 |
| Impact resistance (cm) (du Pont method, load 1 kg, core size of impact ⅛ inches) | 35 | 35 | 35 | 35 | 35 |
| Appearance | Fine surface roughening, wrinkles | No surface roughening and no wrinkle | | | |

Note
*[1] Cut through temperature: The film coated plate was placed in an apparatus shown in FIG. 4 to measure a cut through temperature. In FIG. 4, numeral 1 denotes a load (2 kg), numeral 2 denotes supporting metallic parts, numeral 3 denotes a sample (a film coated plate 0.775 mm thick), numeral 4 denotes the coated surface, numeral 5 denotes a steel ball (diameter 5 mm), numeral 6 denotes washer, numeral 7 denotes a steel plate (0.8 mm thick), numeral 8 denotes an insulating plate (glass cloth) and numeral 9 denotes an alternating electric current source (100 V).
*[2] Erichsen test according to JIS B 7777. The greater value shows better flexibility.

As shown in Table 5, the polyamide-imide resin modified with a polyisocyanate containing one or more isocyanurate rings and a lactam and being soluble in cresol before admixture with a metal salt is good in heat resistance (cut through temperature), impact resistance, flexibility (Erichsen test, impact test) but poor in appearance, i.e. fine surface roughening and wrinkles are generated on the coating surface. On the contrary, in Examples 15 to 18 wherein various kinds of metal salts as listed in Table 5 were added to the polyamide-imide resin, good results are obtained not only in heat resistance, impact resistance, and flexibility but also in surface appearance. This clearly shows that the addition of the special metal salts to the polyamide-imide resin is effective for improving the coated surface.

Therefore, the polyamide-imide resin composition of this invention can be effectively applied to heat resistant cooking devices, magnetic wires, etc.

What is claimed is:

1. A polyamide-imide resin composition comprising
    (A) a polyamide-imide resin produced by reacting in a cresol, phenol or xylenol solvent a polyisocyanate containing one or more isocyanurate rings, an aromatic diisocyanate, a lactam and a polycarboxylic acid containing at least one acid anhydride group, and
    (B) at least one member selected from the group consisting of
        (i) an alkoxy modified amino resin,
        (ii) a polyisocyanate containing one or more isocyanurate rings,
        (iii) a phenol-formaldehyde resin,
        (iv) an epoxy resin,
        (v) a polyester resin having one or more hydroxyl groups obtained by using terephthalic acid and/or isophthalic acid as an acid component, and
        (vi) at least one metal salt of Sn, Mn, Co and/or Zn.

2. A polyamide-imide resin composition according to claim 1, wherein as the component (B) a polyisocyanate containing one or more isocyanurate rings is used in an amount of 1 to 20 parts by weight in terms of the solid content per 100 parts by weight in terms of the solid content of the polyamide-imide resin.

3. A polyamide-imide resin composition according to claim 1, wherein as the component (B) a phenol-formaldehyde resin is used in an amount of 1 to 30 parts by weight in terms of the solid content per 100 parts by weight in terms of the solid content of the polyamide-imide resin.

4. A polyamide-imide resin composition according to claim 1, or 3, wherein the phenol-formaldehyde resin is phenol-formaldehyde resin, an alkylphenol-formaldehyde resin or a phenol-formaldehyde resin modified with an amino compound.

5. A polyamide-imide resin composition according to claim 1, wherein as the component (B) an epoxy resin is used in an amount of 1 to 30 parts by weight in terms of the solid content per 100 parts by weight in terms of the solid content of the polyamide-imide resin.

6. A polyamide-imide resin composition according to claim 1 or 5, wherein the epoxy resin is a bisphenol type epoxy resin, a novolac type epoxy resin, an alicyclic type epoxy resin or a heterocyclic-ring containing epoxy resin.

7. A polyamide-imide resin composition according to claim 1, wherein as the component (B) a polyester resin having one or more hydroxyl groups obtained by using terephthalic acid and/or isophthalic acid as an acid component and tris(2-hydroxyethyl) isocyanurate as an alcohol component is used in an amount of 1 to 300 parts by weight in terms of the solid content per 100 parts by weight in terms of the solid content of the polyamide-imide resin.

8. A polyamide-imide resin composition according to claim 1, wherein as the component (B) a metal salt of Sn, Mg, Co or Zn is used in an amount of 0.01 to 10 parts by weight per 100 parts by weight in terms of the solid content of the polyamide-imide resin.

9. A polyamide-imide resin composition according to claim 1 or 8, wherein the metal salt of Sn, Mg, Co or Zn is dibutyl tin laurate, dibutyl tin acetate, manganese naphthenate, manganese octoate, cobalt naphthenate, cobalt octoate, zinc naphthenate, or zinc octoate.

10. A polyamide-imide resin composition according to claim 1, wherein the component (A) is used in an amount of 100 parts by weight and the component (B) is used in an amount of 1 to 300 parts by weight.

11. An electrical conductor having an insulating coating consisting essentially of the polyamide-imide resin composition of claim 1.

* * * * *